Patented Mar. 15, 1938

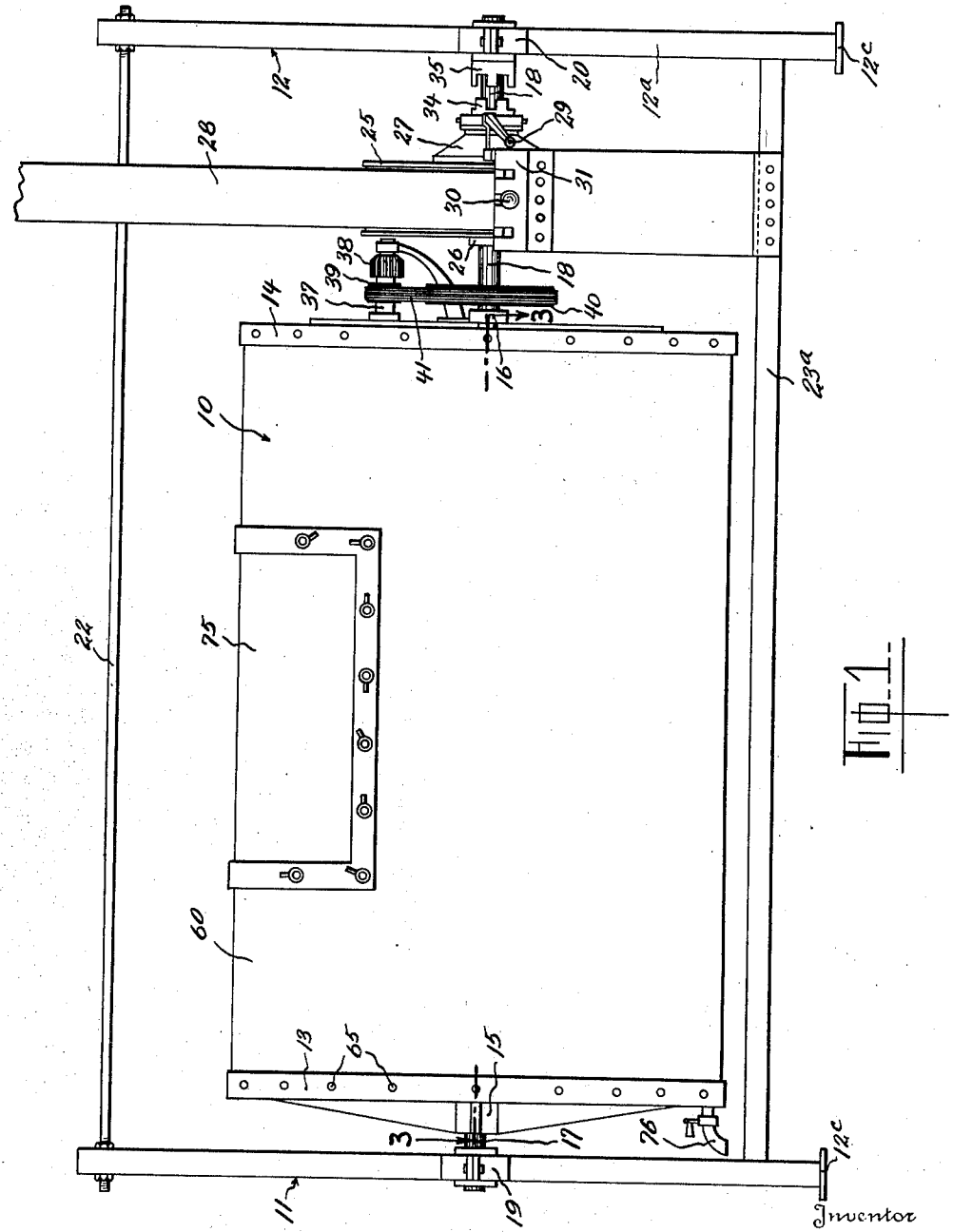

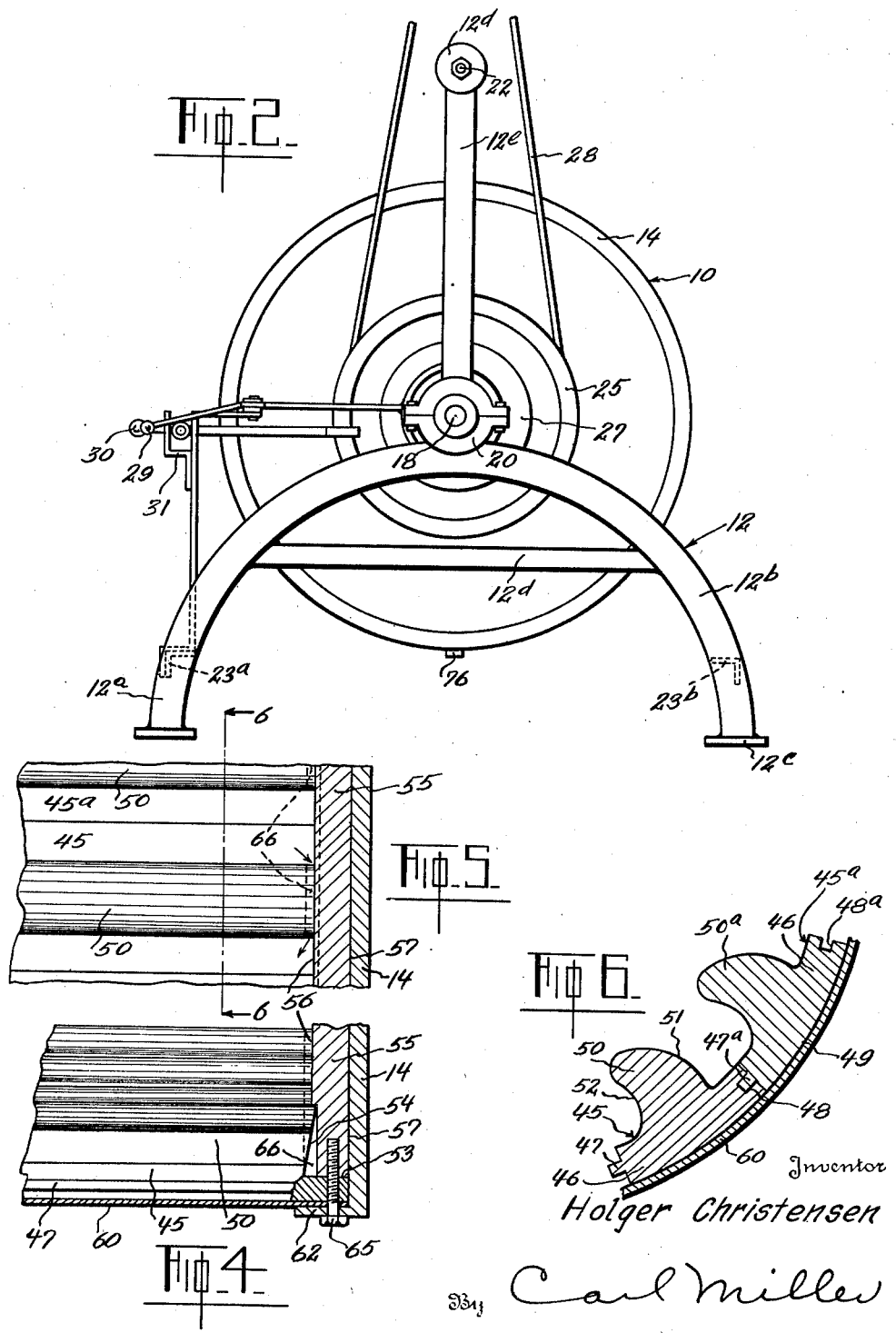

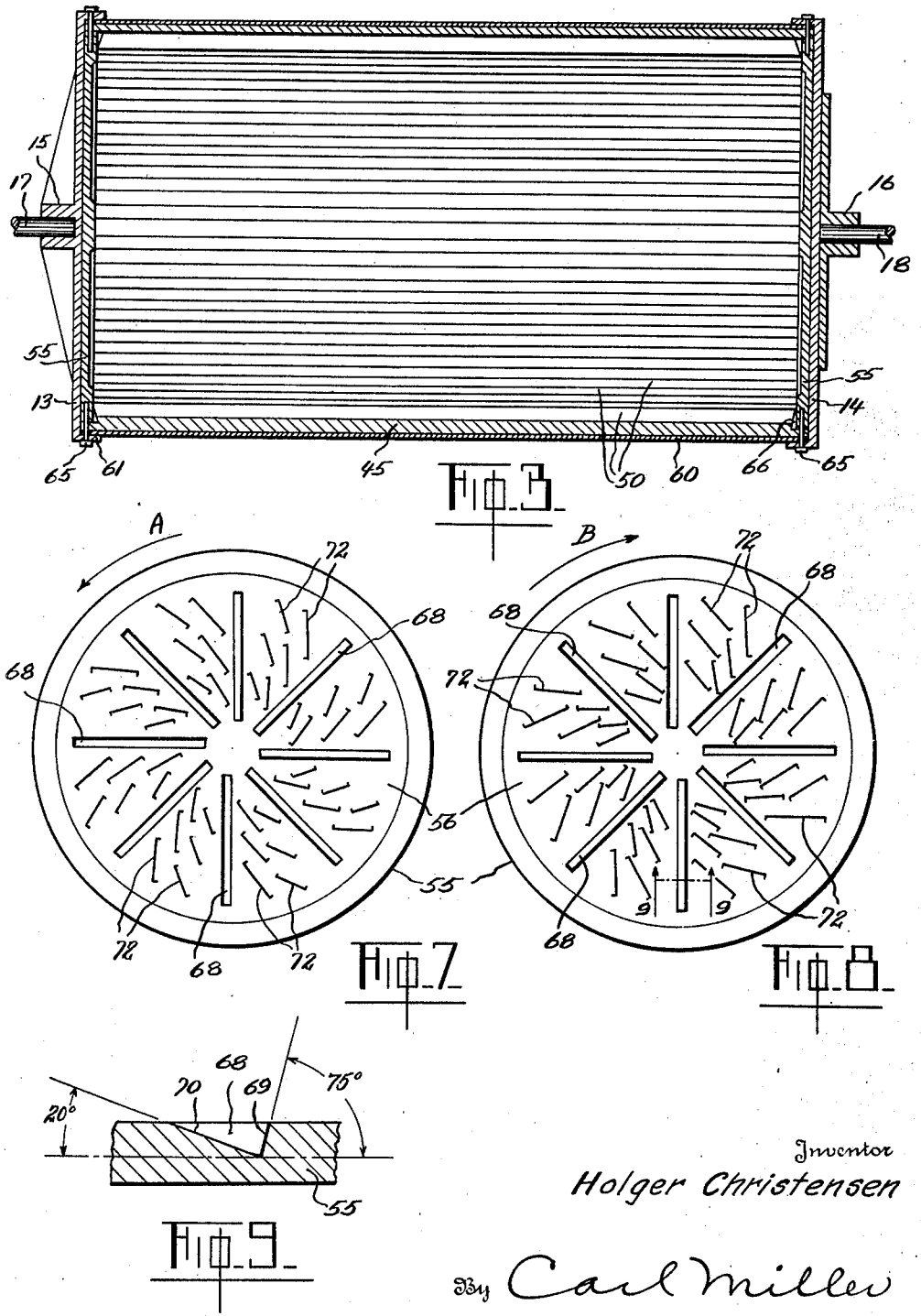

2,111,356

UNITED STATES PATENT OFFICE 2,111,356

ROLL-OVER CHURN

Holger Christensen, Loyalton, Calif.

Application October 7, 1936, Serial No. 104,409

12 Claims. (Cl. 259—81)

This invention relates to a butter churn and butter working machine.

The main object of this invention is to provide within a horizontally rotatable cylindrical drum driven by suitable mechanism, a series of blades or abutments extending lengthwise of the drum from end to end and fixedly arranged at regularly spaced intervals around the entire inside wall of the drum to provide a continuous working surface thereon, the construction being such that there are no internal moving parts within the drum.

A further object of the invention relates to the construction of the drum end plates that are provided on their inside surface with grooves and ridges of special design that act to break the surface of the plates so as to eliminate drag and the sticking of the butter during the working and churning thereof.

Other objects of the invention relate to the manner of assembly of the parts of the drum so as to eliminate all projecting bolts and other fastening means within the interior thereof; to the provision of means permitting the positive withdrawal of all liquid within the drum and at the same time preventing the wedging of any butter at the corners of the blades; to the provision of a churn construction that will be both easier to clean and more sanitary; to permit of quick access to the interior of the churn for the removal of the butter and that will be both simple and efficient in its operation.

The above and other objects of the invention will become apparent as the description thereof given hereunder proceeds with reference to the annexed drawings wherein:—

Figure 1 is a side elevational view of the entire churn and operating mechanism;

Figure 2 is a front elevational view of the churn;

Figure 3 is a longitudinal section through the drum taken on line 3—3, Figure 3;

Figures 4 and 5 are detail sectional views showing respectively in elevation and plan the connection of the end plates to the drum and the end construction of the drum blades;

Figure 6 is a partial sectional view of a pair of blades taken on line 6—6, Figure 5, showing the manner of assembling the blades;

Figures 7 and 8 are plan views of the drum end plates; and

Figure 9 is a detail sectional view taken on line 9—9, Figure 8, showing the construction of one of the main grooves on the end plates.

Referring to Figure 1 of the drawings, the drum 10 of the roll-over churn is shown as comprising a large cylinder preferably made of greater length than diameter and horizontally mounted for rotational movement on the frame members 11 and 12. The drum 10 is provided at each end thereof with end caps 13 and 14, each formed respectively with axially projecting bosses 15 and 16. Fixed within the boss 15 is one end of a shaft 17 that extends outwardly of said boss; and within the boss 16 is similarly fixed one end of a shaft 18, both shafts 17 and 18 being co-axial and disposed on the longitudinal axis of the drum 10. The shafts 17 and 18 are rotatably supported at their free ends within journal bearings 19 and 20, respectively mounted on the frame members 11 and 12.

Inasmuch as the frame members 11 and 12 are each identical in construction, a description of only one will accordingly be necessary. Thus, the frame member 12, see Figure 2, comprises legs 12$^a$ and 12$^b$ that are widely spaced to provide a stable mounting for the drum, each leg terminating in a foot 12$^c$, said legs being further reinforced by a cross-member 12$^d$. The legs 12$^a$ and 12$^b$ at their upper ends are joined together and at this point support the journal bearing 20. Extending upwardly from the housing of the journal bearing 20 is a standard 12$^e$ arranged in the vertical center plane of the frame member 12, the standard 12$^e$ terminating at its upper end in a boss 12$^d$. Connecting the boss 12$^d$ with the similar boss on the standard of the frame member 11 is a horizontal rod 22 that is adjustably and rigidly secured at its ends to said bosses, said rod 22 functioning to maintain the frame members 11 and 12 vertical and in definite spaced relation. Adjacent the bottom of the legs of the frame members are arranged spaced longitudinally parallel rigid connecting members 23$^a$ and 23$^b$, that connect the same; thus providing along with the other frame elements a rigid supporting structure for the rotating drum 10 and the power operating mechanism driving the same.

The power operating mechanism for driving the drum 10 is the subject matter of my copending U. S. application for patent, Serial Number 99,783, filed September 8th, 1936, and is completely set forth therein. Accordingly a detailed description thereof will not be given herein, the same briefly consisting of a pulley 25, see Figure 1, that is freely mounted for rotational movement on a sleeve 26 adapted to have sliding movement on the shaft 18. A clutch 27 mounted on the sliding sleeve 26 cooperates with the pulley 25, which is driven by a belt 28 from a source of power (not shown), for transmitting the drive from said pulley to said sleeve, the operation of the clutch 27 being controlled by the clutch lever 29. Movement of the sliding sleeve 26 is controlled by a slide arm 30 operating within a slide box 31 rigidly supported on the frame brace 23ª, the arm 30 being shown in neutral position. The end of the sliding sleeve 26 extending beyond the clutch 27 is provided with a jaw clutch element 34 that is adapted to cooperate with a like jaw clutch element 35 rigidly connected to the shaft 18. Movement of the sliding sleeve 26 to the right, viewing Figure 1, under the control of the slide arm 30 will cause the jaw clutch elements 34 and 35 to engage, thus transmitting the drive to the shaft 18 the rotation of which drives the drum 10, this relationship being that of high speed.

Supported on the drum cap 14 in parallel relationship to the shaft 18 is a jack-shaft 37 on which is mounted for simultaneous operation a pinion 38 and sprocket 39. In alignment with the sprocket 39 and mounted on the shaft 18 is a larger sprocket 40, both of said sprockets being connected by a chain belt 41 to constitute a chain drive of any desired type. The pinion 38 is adapted to mesh with an annular gear provided within the pulley 25 (not shown) upon movement of the slide sleeve 26 carrying said pulley, to the left, to affect the meshing of the pinion 38 with the annular gear on the pulley. This relationship provides for a low speed drive of the drum 10 in the manner as fully described in said copending application. From the above it is thus apparent that the drive mechanism provides for a high and low speed, preferably in the ratio of 2 to 1, which is affected as desired by the simple expedient of moving the sliding sleeve 26 carrying the pulley 25, either to the right or left under the control of the slide arm 30.

The drum 10 as above indicated is cylindrical in form and preferably is made of a length substantially greater than the diameter of the same, the drum built up of a plurality of interfitting sections 45 preferably made of a suitable wood or other material. Each section 45 extends the full length of the drum 10 and comprises a base 46 of uniform width and thickness throughout the entire length of the section, one edge of the section being provided with an integral tongue 47 and the other edge with a groove 48 that is adapted to receive in interlocking engagement the tongue 47ª of an adjacent section 45ª, see Figure 6. Each section is so curved and shaped that upon the interlocking assembly of all the sections there will be produced a cylinder the exterior surface 49 of which is truly cylindrical.

Formed integral with the section 45, and likewise with each other section is an agitating element or blade 50, one side 51 of which is shown convexly curved and the other side 52 of which is shown concavely curved; the relationship of the curved sides to the tongue and grooved ends of each section being the same, whereby in the assembly of the sections to form the drum all sides of like curvature will face in the same direction with the concave sides facing the direction of rotation of the drum. It is to be understood that while in the preferred form of the blades shown in section in Figure 6, the sides of the blade are shown curved; that other shapes and curvature may be imparted to the blades as may be found desirable. The blades 50 are each coextensive with their associated section and terminate short of the ends of said sections to form a cylindrical shoulder 53 at each end of the drum, the ends 54 of said blades being inclined inwardly for a purpose to be hereinafter described.

At each end of the drum 10 is provided a circular end plate 55 of a diameter that will permit the same to snugly fit within the cylindrical shoulder 53, the inner surface 56 of each end plate abutting the ends of the blades 50 and the outer surface 57 thereof being flush with the ends of the sections 45 as clearly shown in Figure 4. To protect the exterior surface 49 of the sections there is provided a metallic reinforcing sheath 60 of a length equal to that of said sections. The end caps 13 and 14 as above described are each further provided with cylindrical flanges 61 and 62, respectively, that overlap the ends of the sheath and extend toward each other in the manner shown in Figure 3, said end caps bearing against the end plates 55 to reinforce the same as well as locking the same in position. To positively secure the end plates and end caps to the cylindrical wall of the drum, fastening means comprising screws or bolts 65 are projected radially through the flanges 62, sheath 60 and sections 45 into the body of the end plates 55 as clearly shown in Figure 4, said bolts 65 being spaced in a circular row around the entire peripheral extent of the flanges 61 and 62, as shown in Figure 1.

Between the inclined end 54 of each blade 50 and the inside surface 56 of the abutting end plate there is defined a wedge-like opening 66, see Figures 4 and 5, that extends the full width of the blade, the function of these openings to be hereinafter described.

The inside surface 56 of each end plate 55 is provided with a plurality of equally spaced radial grooves 68 that extend substantially from the center of the plate to a point short of the edge thereof. Each groove 68 consists of two sides 69 and 70, see Figure 9, that are inclined to each other, the side 69 being inclined at an angle of 75° and the side 70 being inclined at an angle of 20°. The side 70 of each groove 68, on each of the end plates is positioned in the direction of rotation of the same as indicated by the arrows A and B. Between the radial grooves 68 are arranged a plurality of shallow grooves 72 each of which is substantially inclined in the same direction relative to the radial grooves 68, as shown. It is to be understood that the shallow grooves 72 and radial grooves 68 may be given any desired configuration, size, length and position, aside from the preferred form shown in Figures 7 and 8.

The drum 10 is provided with a removable cover 75 to permit the placement therein of cream and the other ingredients necessary to produce butter, as well as to permit the cleansing of the interior thereof. At one end of the drum 10 is provided a drain valve 76 through which the buttermilk or other liquids may be withdrawn.

The blades 50 and the grooves 68 and 72 on the end plates comprise the only agitating means within the drum for churning the cream in the formation of butter, the action of the same being to produce a rolling over of the cream as the drum rotates. The grooves 68 and 72 furthermore act to prevent drag and the sticking of butter on the end plates. In view of the openings 66 at the ends of the blades 50, there is thus prevented any possibility of butter lodging in the corners, the openings 66 furthermore acting to permit the flow of liquid therethrough not only during the churning of the butter to affect the above result but also in providing a more efficient means for cleaning the interior of the drum by permitting the circulation of water in places usually inaccessible. In addition, the fact that there are no moving parts within the drum renders the cleaning thereof most easy and the interior thereof more accessible. The blades 50 along the wall of the drum provide a working surface for the butter after all the liquid has been drawn off. In salting of the butter, the placing of the salt within the drum along the blades and the rolling action of the butter thereon will result in a complete intermingling of the salt in the butter.

While the above drum construction is particularly adaptable for use in a butter churn it is to be understood that the same may equally as well be used for other purposes where the result desired is to be accomplished by an agitation of a liquid.

Having thus set forth and disclosed the nature of this invention, what is claimed is:

1. A drum for a butter churn comprising a plurality of longitudinally connected sections arranged in interlocking relation to form a cylinder open at each end, an agitating blade having concave-convex walls provided on each section arranged co-extensive therewith and terminating at each end short of the ends of its associated section to provide an uninterrupted cylindrical shoulder, each blade being curved in the same direction and of greatest thickness at its base and of diminishing thickness towards its free edge, said free edge being rounded, a circular end plate of substantial thickness for each end of the cylinder closely fitted within each cylindrical shoulder with the outer surface thereof flush with the ends of said sections and with the inner surface thereof abutting the ends of said blades, said inside surface of each end plate being formed with a plurality of angularly related shouldered depressions to provide a multitude of agitating surfaces, and fastening means projecting radially inwardly through certain of said sections into the body of said end plates for uniting said end plates to said cylinder whereby no portion of said fastening means will be visible within the interior of said drum.

2. In the drum as specified in claim 1; said agitating blades being each formed integral with its associated section, and with the concave-convex walls at their juncture with said section spaced from the longitudinal edges thereof, the arrangement of said blades being such that the concave sides are directed in the direction of rotation of said drum.

3. In the drum as specified in claim 1; the inner surface of each of said end plates being provided with deep radial grooves extending substantially from the center of the plate to the edge thereof, said grooves being defined by angularly related walls, and a plurality of smaller shallow grooves formed in said surface between said radial grooves and each inclined in the same general direction with respect to said radial grooves.

4. In the drum as specified in claim 1; and a flanged cap member fitted over the ends of said cylinder with the flanges thereof overlapping the end portions of said sections and directed towards each other, said fastening means being projected through said cap flanges, and constituting a common fastening means for the connecting together of said end plates, sections and caps.

5. In the drum as specified in claim 1; and a cylindrical reinforcing and protecting sheath applied exteriorly to said cylinder, a flanged cap member fitted over the ends of said sheath with the flanges thereof directed towards each other, said fastening means being projected through said cap flanges and sheath and constituting a common fastening means for the connecting together of said end plates, sections, sheath and caps.

6. In the drum as specified in claim 1; the ends of said blades being inclined towards said sections so as to define with the surface of the end plates abutting the same a wedge-like opening to permit of complete drainage of liquid and at the same time prevent the deposit of butter at the corners.

7. A drum for a butter churn comprising a cylinder closed at both ends and horizontally supported for rotational movement about the longitudinal axis thereof; circumferentially spaced longitudinal projections on the inside cylindrical wall each having concave-convex walls, and the inside surface of each closed end being formed to provide a plurality of shouldered depressions varying in character whereby the entire internal surface of said drum is irregular in contour and constitutes the sole agitating means therewithin.

8. A drum for a butter churn comprising a cylinder closed at both ends and horizontally supported for rotational movement about the longitudinal axis thereof; the internal cylindrical surface of said drum being provided with ridges of equal size and each so formed as to be curved in the direction of rotation of said drum and the inside surface of each closed end being formed to provide a plurality of shouldered depressions varying in character and certain of which are non-symmetrically arranged whereby to constitute the sole agitating means therewithin.

9. An end closure for a butter churn drum comprising a circular plate of substantially uniform thickness; the side of said end plate adapted to face the interior of said drum having a smooth annular abutment portion formed thereon adjacent the peripheral edge of said plate; a plurality of deep radial grooves provided on the same side of said plate as said abutment portion and extending from the same to a point in close proximity to the center of said plate, said radial grooves being each of equal length and equally spaced; and a plurality of shallow grooves provided in said side between said radial grooves and each arranged in substantially the same angular relation to said radial grooves, said grooves constituting both an agitating medium within said churn and a means to prevent drag and the sticking of butter to said end plate.

10. In the end plate as specified in claim 9; said radial grooves being each V-shaped, one side wall of each being at an obtuse angle and the other side wall at an acute angle relative to the plane of said plate, the radial grooves being so disposed that the walls thereof inclined at an obtuse angle are each extended in the same direction as the direction in which said drum is adapted to rotate.

11. A drum for a butter churn comprising a plurality of like longitudinal sections of equal length, each section provided with an upstanding agitating blade having concave-convex walls arranged co-extensive therewith and between the longitudinal sides thereof, tongue and groove formations provided along the respective side edges of each section for interfitting engagement whereby said sections in assembled relation will form a cylinder open at each end, said sections being each so formed as to provide smooth flat surfaces between said blades the concave-convex walls thereof merging with said flat surfaces, each blade being of the same height and curved in the same direction and being thickest at its base and of diminishing thickness towards its free edge, said free edge being rounded, a circular end plate fitted within each open end of said cylinder, the inside surface of each end plate being provided with a plurality of angularly related shouldered depressions to provide a multitude of agitating surfaces, and means attaching said end plates to said cylinder ends.

12. In the drum as specified in claim 11, wherein the blade of each section terminates short of the ends thereof to provide an internal circular shoulder at each end of said cylindrical drum, said circular end plates being fitted within said circular shoulders in abutting engagement with the ends of said blades, and said attaching means comprising fastening elements projecting inwardly through said sections radially into the body of said end plates for attaching said end plates to said cylinder.

HOLGER CHRISTENSEN.